United States Patent [19]

Snyder

[11] 3,818,139

[45] June 18, 1974

[54] MULTIPATH CONFERENCE SYSTEM WITH SWITCHING

[76] Inventor: Robert G. Snyder, P.O. Box 411, Dania, Fla. 33004

[22] Filed: July 23, 1973

[21] Appl. No.: 381,374

Related U.S. Application Data

[63] Continuation of Ser. No. 191,667, Oct. 22, 1971, abandoned.

[52] U.S. Cl. .............................................. 179/1 CN

[51] Int. Cl. .............................................. H04m 9/00

[58] Field of Search ........ 179/1 H, 1 CN, 1 SW, 37, 179/38

[56] References Cited

UNITED STATES PATENTS

| | | | |
|---|---|---|---|
| 2,912,503 | 11/1959 | Grandstatt | 179/1 CN |
| 3,050,584 | 8/1962 | Miller | 179/1 CN |
| 3,108,157 | 10/1963 | Feiner | 179/1 CN |
| 3,423,538 | 1/1969 | Gaunt | 179/1 CN |
| 3,437,758 | 4/1969 | Clement | 179/1 CN |
| 3,499,115 | 3/1970 | Sontag | 179/37 |
| 3,555,190 | 1/1971 | Braum | 179/1 CN |

FOREIGN PATENTS OR APPLICATIONS

| | | | |
|---|---|---|---|
| 1,813,345 | 6/1970 | Germany | 179/1 CN |

OTHER PUBLICATIONS

Peard, Conference Circuit for Telephone Exchange, IBM Technical Disclosure Bulletin, 4/1970, pp. 1,743–1,744.

*Primary Examiner*—Kathleen H. Claffy
*Assistant Examiner*—Jon Bradford Leaheey
*Attorney, Agent, or Firm*—Malin & Haley

[57] ABSTRACT

A conference system for a multi-path communication network including a plurality of interconnected channel units each of which is connected to a separate communication path. Each channel unit includes a coupling means, switching means, an amplifier means, an isolation means, a switch control means and a signal bus. The coupling means is connected to the amplifier means or the signal bus by the switching means. The output of the amplifier means is connected to an isolation means and a switch control means. The isolation means is connected to the signal bus. The switch control means is connected to the switching means of each other channel unit in order to switch the coupling means of the other units from the amplifying means to the signal bus when said switch control means is activated.

3 Claims, 2 Drawing Figures

ROBERT G. SNYDER
INVENTOR.
BY
ATTORNEY

ROBERT G. SNYDER
INVENTOR.
BY Eugene [signature]
ATTORNEY

MULTIPATH CONFERENCE SYSTEM WITH SWITCHING

This is a continuation, of application Ser. No. 191,667, filed 10/22/71, now abandoned.

BACKGROUND OF THE INVENTION

This invention relates to a new and improved conference system for a communication network, and, more particularly, to a conference system that is free of regeneration or distortion problems and provides a relatively constant terminal signal level.

In the past, conference systems were generally passive and did not provide any amplifier means. The normally weak signals that were received and used by the coupling networks in a conference system were generally further weakened by efficiency losses in the coupling network, and losses caused by splitting the signal for transmission to the various receivers. The availability of power in such systems was low and therefore provided very weak signals to each conferee. In prior art systems that provided a single or plurality of amplifiers in order to eliminate internal losses of efficiency and splitting, provided less than unity gain. The conferees in such a system are provided with only weak signals due to various line losses in the comunication network. Some elaborate conference systems have been constructed that employ multiplexing or time-sharing circuits, such circuits are costly to manufacture and complex in design.

BRIEF DESCRIPTION OF THE INVENTION

The present invention relates to a conference system for use in a multi-channel communication network. Each conference system includes a plurality of interconnected channel units. Each channel unit includes a coupling means, switching means, isolation means, switch control means, and a signal bus. The coupling means is connected to the amplifier means or the signal bus by the switching means. An isolation means is connected between the amplifier means and the signal bus. A feedback means is connected between the signal bus and the amplifier means. A signal activated switch control means is connected between the amplifier means and the switching means of each other channel unit in order to switch the connection of the coupling means to either the amplifying means to the signal bus. When any switch control means is activated by a proper input signal from the communication pathway, the particular channel unit becomes the master channel. The signal activated switch control means in the master channel actuates the switching means of the other channel units which become the slave channel units, to isolate their amplifying means by disconnecting the amplifying means from the communication pathway, and connecting the communication pathway to the master channel unit by way of the signal bus. Thereafter, when the input signal is terminated, the above described interconnected channel units allow the amplifying means to be reconnected to its own communication pathway to listen for another activating input signal.

It is an object of this invention to provide a relatively non-complex, low-cost conference system.

Another object of this invention is to provide a versatile conference unit that may be adapted to suit the characteristics of audio as well as data transmissions, and that may be easily adjusted or designed to be compatable to various types or characteristics of communication networks.

A further object of this invention is to provide a circuit having adaptable switching characteristics.

In accordance with these and other objects which will be apparent hereinafter, the instant invention will now be described with particular reference to the accompanying drawing.

DESCRIPTION OF A PREFERRED EMBODIMENT

Figure 1:
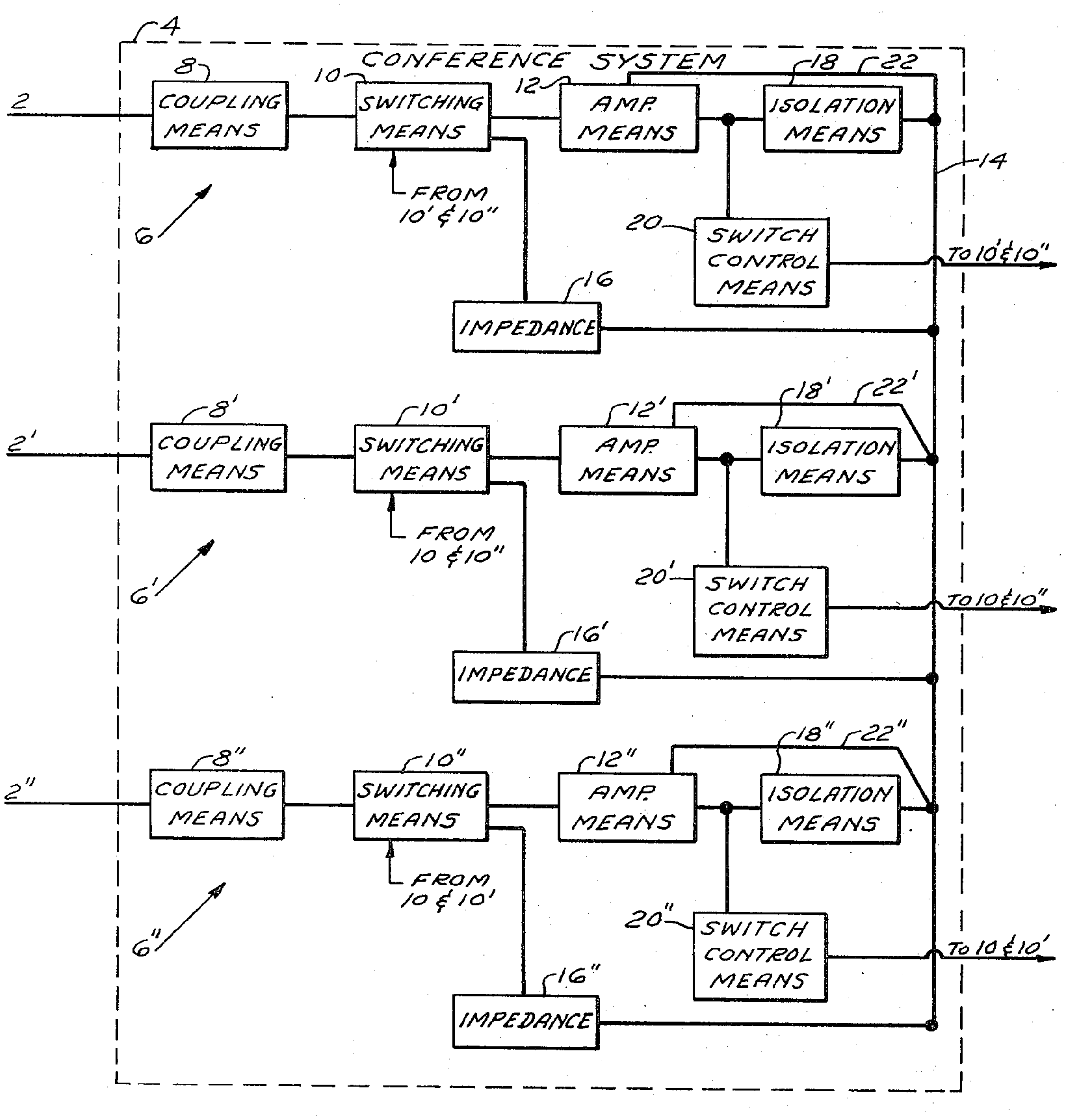
FIG. 1 is a block diagram of the conference system.

Referring now in detail to the drawing, wherein a preferred embodiment of the new and improved conference system is shown, and referring, particularly, to FIG. 1, the transmission signals from the two telephone lines or the lines of other types of communication networks, are generally designated by numerals 2, 2′, and 2″ are connected to a conference system 4. The conference system 4 includes a plurality of interconnected channel units 6, 6′, and 6″ each of which includes a coupling means 8, 8′, and 8″ connected to line 2, 2′, and 2″, respectively. The coupling means 8, 8′, and 8″ are connected to switching means 10, 10′, and 10″, respectively. The switching means 10, 10′, and 10″ connect the coupling means 8, 8′, and 8″ to either the amplifier means 12, 12′, and 12″ or the signal bus 14 by way of the impedance matching circuit 16, 16′, and 16″, respectively. The amplifier means 12, 12′, and 12″ are connected to both the isolation means 18, 18′, and 18″ and the switch control means 20, 20′, and 20″. The isolation means 18, 18′, and 18″ are connected to the signal bus 14 with a feedback means 22, 22′, and 22″ connected between the signal bus and the amplifier means. Each switch control means 20, 20′, and 20″ are connected to the switching means of each other channel unit, as shown by the output arrow, to switch the coupling means from the amplifing means to the signal bus by way of the impedance matching means or by way of a direct line connected between the switching means and the signal bus. When any switch control means 20, 20′, and 20″ is activated by a proper input signal from the communication pathway, the particular channel unit becomes the master channel. The activated switch control means activates the switching network 10, 10′, and 10″, as shown by the input arrows, of the other channel units or slave channel units to isolate their amplifing means by disconnecting the communication pathway from the amplifying means and connecting the communication pathway to the master channel unit to the signal bus. Thereafter, when the input signal is terminated, the above described interconnected channel units allow the communication pathway to be reconnected to its own amplifing means.

Figure 2:
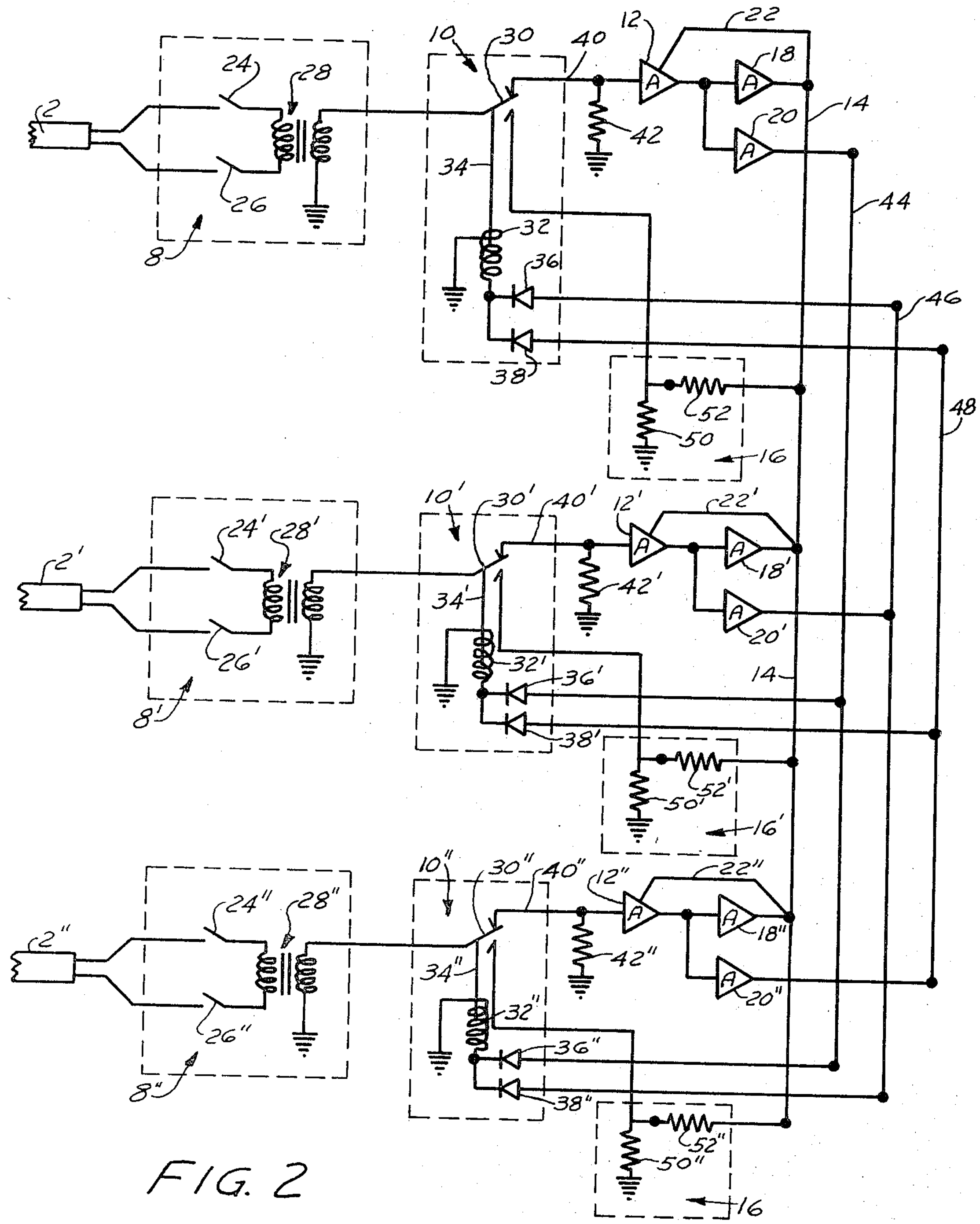
FIG. 2 is a schematic of one conference circuit.

Referring now to FIG. 2, one example of a specific circuit, the communication network lines 2, 2′, and 2″ are connected to the conference system through coupling networks 8, 8′, and 8″, respectively. Each coupling network may include two switches designated as 24 and 26, 24 and 26′ and 24′ and 26″ to connect the two lines 2, 2', and 2'' to the coupling transformer 28, 28', and 28''.

Each coupling network 8, 8', or 8'' is connected to the switching network each of which includes a single pole doubled through switch 30, 30', or 30'' that is moved from the position shown to the second position by coil 32, 32', or 32'' that drives the rod 34, 34', or 34'' connected to the switch arm. The coils are isolated from each other by diodes 36, 36' or 36'' or 38, 38', or 38''.

The switches 30, 30', and 30'' are connected to the amplifier means 12, 12', and 12'' through lines 40, 40', and 40''. A resistor 42, 42' and 42'' is connected between lines 40, 40', and 40'', and ground to match the line impedance. Other types of matching could be utilized. Other types of matching could be utilized.

The amplifier means are connected to the isolation means 18, 18', and 18'' as well as the switching control means 20, 20', and 20''. The isolation means may be a power ampifier. The signal control means may be a signal detector and switching amplifier.

The amplifier means 12, 12', and 12'' must be an automatic gain control devices or compression amplifiers, or other similar device with the control transmitted back from the signal bus to the amplifier means through the feedback line 22, 22', and 22''. The feedback provides control for constant amplitude of the output signal to deliver constant power output to each of the other channels connected to signal bus 14. The signal from the amplifier means 12, 12', and 12'' are transmitted to the isolation means 18, 18', and 18'' and the switching control means 20, 20', and 20''. The switching control means provide the proper switching characteristics to activate the switching means through lines 44, 46, and 48. When switching control means 20 provides the power to activate switching circuits 10' and 10'' through line 44, coils 32' and 32'' are active through diodes 36' and 36''. When switching control means 20' provides the power to switch switching circuits 10 and 10'' through line 46, coils 32 and 32'' are activated through diodes 36 and 38''. When switching control means 20'' provides power to activate switching circuits 10 and 10'' through line 48, coils 32 and 32' are activated through diodes 38 and 38'. The diodes are utilized to prevent activation of undesired relays.

The impedance matching circuits 16, 16', and 16'' provide proper impedance to the line by utilizing resistors 50, 50'', and 50'' and also provide isolation of the feedback circuit 22, 22', and 22'' from the lines 2, 2', and 2'' by resistors 52, 52', and 52''.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A conference system for a multi-path communication network comprising, a plurality of channel units each connected to separate communication pathway in said multipath communication network, any particular channel unit when activated by a first input signal becomes the master channel unit, each said channel unit includes, amplifier means having an input and an output, signal bus bar means common to each unit, isolation means connected between said amplifier means output and said signal bus bar means, feedback means connected between the signal bus bar means and said amplifier means to provide automatic gain leveling of said amplifier means, switch control means activated by a signal output from said amplifier means, and switching means to connect an individual one of said communication pathways to either said amplifier means input or said signal bus bar means, said switching means normally connected to said amplifier means input is controlled by any other channel units, switch control means to switch said individual communication pathway from the amplifier means input to the signal bus bar means.

2. A conference system for a multi-path communication network as set forth in claim 1 wherein, said switching means for attenuating the amplifiers of the other channel units, thereby, preventing the switch control means for activating and allowing the master channel to remain in control.

3. A conference system for a multi-path communication network as set forth in claim 1 wherein, said switch control means connected between said amplifier means output and the switching means of each other channel unit switches the other communication pathways from their amplifier means to the signal bus bar means in order to attenuate their amplifier means and to connect the other communication pathways to the master channel unit, whereby the master channel unit may use high gain and power amplifiers without regeneration.

* * * * *